United States Patent [19]
Kasperik et al.

[11] Patent Number: 6,123,488
[45] Date of Patent: Sep. 26, 2000

[54] CUTTING INSERT WITH UNIVERSAL IDENTIFICATION

[75] Inventors: James R. Kasperik, Latrobe, Pa.;
 Dieter H. Fischer, Feucht, Germany;
 Terry L. Ashley, Greensburg; James M. Waggle, Derry, both of Pa.

[73] Assignee: Kennametal Inc., Latrobe, Pa.

[21] Appl. No.: 09/220,875

[22] Filed: Dec. 23, 1998

[51] Int. Cl.[7] .................................................. B23B 27/16
[52] U.S. Cl. ........................ 407/113; 407/114; 407/115; 407/116
[58] Field of Search ................. 407/1.11, 113–116, 407/103, 77, 78

[56] References Cited

U.S. PATENT DOCUMENTS

| | | | |
|---|---|---|---|
| D. 347,012 | 5/1994 | Huston et al. | D15/139 |
| D. 362,859 | 10/1995 | Wiman et al. | D15/139 |
| D. 366,882 | 2/1996 | Wiman et al. | D15/139 |
| D. 390,854 | 2/1998 | Satran et al. | D15/139 |
| D. 393,270 | 4/1998 | Murèn et al. | D15/139 |
| D. 395,663 | 6/1998 | Murèn et al. | D15/139 |
| D. 396,479 | 7/1998 | Satran et al. | D15/139 |
| 5,147,159 | 9/1992 | Lowe et al. | 407/114 |
| 5,249,894 | 10/1993 | Bernadic et al. | 407/114 |
| 5,791,832 | 8/1998 | Yamayose | 407/113 |

OTHER PUBLICATIONS

"Make A Sharp Turn . . . " Sandvik Coromant Advertisement, Metal Working World, Mar. 1998.
"QNMG" Iscar Advertisement, Aug. 1998.
DIN Standard 3141, Dec. 1963.

*Primary Examiner*—Henry W. H. Tsai
*Attorney, Agent, or Firm*—Larry R. Meenan

[57] ABSTRACT

A cutting insert is disclosed with triangular shapes imprinted on the top surface of the insert whereby the number of triangular shapes is representative of the cutting range for which the insert will function best. A method for imparting such shapes to the cutting insert is also disclosed.

21 Claims, 13 Drawing Sheets

CUTTING INSERT WITH UNIVERSAL IDENTIFICATION

BACKGROUND OF THE INVENTION

1. Field of the Invention

This invention relates to cutting tools for machining operations and, more specifically, to cutting inserts used for metalworking operations whereby the face of the insert is imprinted with a universal identification to simplify use.

2. Description of the Related Art

Disposable cutting inserts are utilized throughout the metalworking industry and come in various shapes, sizes and designs to accomplish a wide range of operations including milling, boring and threading. Because cutting inserts are generally designed to perform a limited operation, a typical large machine shop may have a multitude of different inserts. As an example, different cutting inserts are utilized to produce different surfaces on a workpiece ranging from rough to smooth. Different manufacturers have attempted to put labels on the face of the insert to assist in utilizing a certain insert in the recommended application. As an example, in the Sandvik Coromant publication entitled MetalWorking World dated March of 1998, an advertisement entitled "Make A Sharp Turn Towards Higher Productivity" discusses turning inserts using imprinted letters on the face of the insert which indicate whether or not the insert is suitable for fine, medium or rough cutting operations by designating the letter "F", "M", or "R" on the face of the insert. However, additional letters and numbers are also used on the face of the insert which make interpreting such information difficult without the use of an interpretive table unique to the manufacturer.

ISCAR Limited, in their brochure entitled "QNMG" published in August of 1998, illustrates inserts marked on the face with the letters PP, TF and GN indicating respectively, light-medium, medium and medium-rough cutting applications. However, to understand these letters, it is necessary to use an interpretive table unique to the manufacturer.

With such different systems in place, a need exists to provide indicia on the face of the cutting insert that do not require a detailed table for understanding and may be universally understood without dependency upon understanding letters from the English alphabet.

BRIEF SUMMARY OF THE INVENTION

The subject invention is directed to a cutting insert comprised of a polygonal shaped body having a top surface and a bottom surface with sides therebetween and a cutting edge at the intersection of each side with the top surface, thereby defining an active cutting region on the top surface spaced along and extending inwardly from the cutting edge to about one third of a distance to the center of the insert and an inactive region over the remaining area of the top surface.

A mark is positioned on the top surface of the insert in the inactive region, wherein the mark is comprised of at least two identical imprinted protrusions adjacent to each other on the top surface and wherein the quantity of protrusions in a mark indicates the recommended insert usage. Each protrusion may be "V" shaped and extend from or into the top surface.

The invention is directed to a method for marking a cutting insert having a polygonal shaped body with a top surface and a bottom surface with sides therebetween and a cutting edge at the intersection of each side with the top surface defining a cutting region spaced along and extending inwardly from the cutting edge to about one third of a distance to the center of the insert and an inactive region over the remaining area of the top surface, wherein the method comprises the step of imparting a mark to the top surface of the insert in the inactive region, wherein the mark is comprised of at least two identical imprinted protrusions adjacent to each other on the top surface and wherein the quantity of protrusions indicates the recommended insert usage.

Broken line illustrations in the drawings are not part of the subject matter sought to be patented.

DETAILED DESCRIPTION OF THE INVENTION

Figure 1:
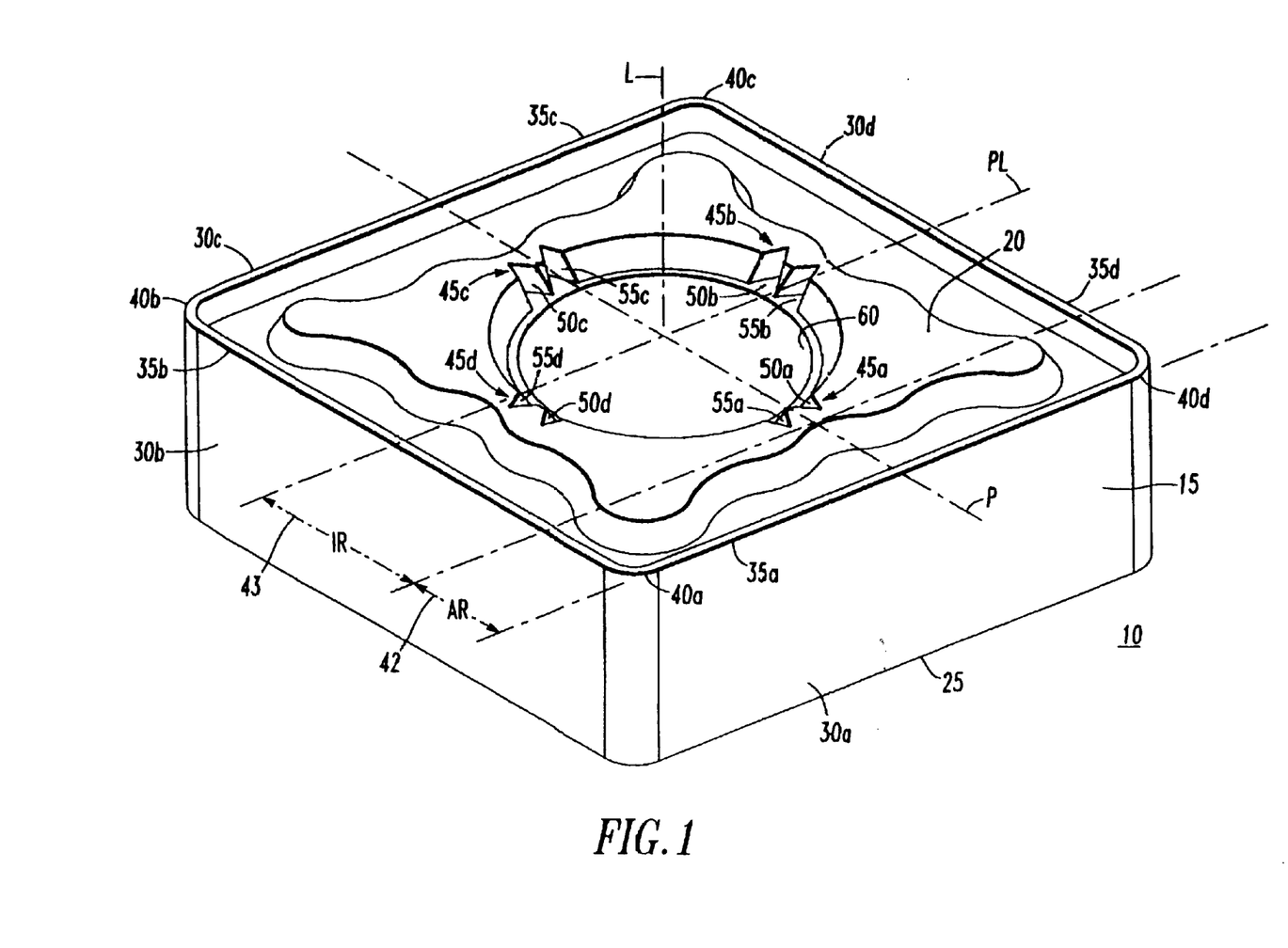
FIG. 1 is a perspective view of a cutting insert according to the first embodiment of the subject invention.

FIG. 1 illustrates a perspective view of a cutting insert 10 having a body 15 with a longitudinal axis L extending through the center of the insert body 15 and having a top surface 20, a bottom surface 25, and sides 30a, b, c, d thereby defining a cutting edge 35a, b, c, d at the intersection of each side 30a, b, c, d on the top surface 20. The cutting insert illustrated in FIG. 1 is quadrilateral and therefore, for convenience, the four corners will be identified as 40a, b, c, and d. When engaged in a cutting operation, utilizing a cutting edge 35a associated with corner 40a and side 30a, the top surface 20 of the insert may be engaged along an active region AR defined by the band illustrated with arrow 42 in FIG. 1. The active region AR extends from the cutting edge 35a to about one-third of the distance to a parallel line PL intersecting with a longitudinal axis L through the center of the cutting insert 10. The insert 10 is not intended to contact a work piece during a machining operation in the area outside of the active region AR. The remaining portion along the top surface 20 to the longitudinal axis L of the insert is an inactive region IR defined by the band illustrated with arrow 43 in FIG. 1.

The active region AR is spaced along and extends inwardly from the cutting edge 35a and the inactive region IR extends beyond the active region AR. It should be noted the orientations of the active region AR and inactive region IR is entirely dependent upon the cutting edge 35a, b, c, d employed during the cutting operations. If, for example, cutting edge 35b were employed for cutting, then the active region AR and inactive region IR would be adjacent to cutting edge 35b and oriented parallel to the cutting edge 35b.

Marks 45a, b, c, d are positioned on the top surface 20 of the insert 10 in the inactive region IR. Each mark 45a, b, c, d is identical and for that reason only mark 45a will be discussed with the understanding such a discussion also applies to marks 45b, c, d.

The mark 45a is comprised of at least two identical imprinted protrusions 50a, 55a which are adjacent to each other on the top surface 20 and are used to signify the cutting range in which the insert will function best. Because a typical machine operator utilizes a large number of different cutting inserts and the optimum use is not apparent from the face of each insert, the mark 45a enables the machine operator to determine if the insert is best suited in one extreme for roughing applications and in another extreme for fine finishing applications with intermediate uses therebetween. Preferably, the mark 45a is comprised of geometries which are not alpha-numeric characters and preferably a single simple geometry may be presented in different quantities to indicate uses from roughing to finishing applications.

In instances in which different cutting edges 35a, b, c, d are to be used for different machining applications, then the quantity of protrusion associated with each cutting edge 35a, b, c, d may be different depending on the intended application of the respective cutting edge 35a, b, c, d.

In instances in which all of the cutting edge 35a, b, c, d are to be used for the same application, it may not be necessary to include multiple marks 45a, b, c, d and in such an instance, a single mark 45a may suffice.

The shape of the protrusions 50a, 55a illustrated in FIG. 1 is generally "V" shaped. This is one example of using a mark which is not an alpha-numeric character which permits insert identification independent of a need for the machine operator to understand letters associated with a specific language such as English thereby providing a universal mark which may be understood independent of the language in which the machine operator is skilled.

The selection of "V" shape is intentional to approximate the surface symbols identified in the universally accepted DIN 3141 Standard for Surface Symbols In Drawings. The Table 1 found below illustrates the significance of one, two, three and four "V" shapes of triangles, where R+ is the maximum permissible peak-to-valley height in microns and where 1 micron equal 0.001 inches.

TABLE 1

SIGNIFICANCE OF QUANTITY OF PROTRUSIONS IN A MARK

| Surface Symbol | Insert Application | Surface Finish Range (R+) (microns) |
| --- | --- | --- |
| ▲ | Roughing | 160–25 |
| ▲▲ | General Purpose | 40–10 |
| ▲▲▲ | Finishing | 16–2.5 |
| ▲▲▲▲ | Fine Finishing | 1–0.4 |

The insert illustrated in FIG. 1 has a center aperture 60 typically used to mount the insert 10 within a toolholder (not shown). Since the center aperture 60 is in the inactive range IR of the cutting insert 10, a preferred location for the marks 45a, b, c, d is adjacent to the center aperture 60.

Figure 2:
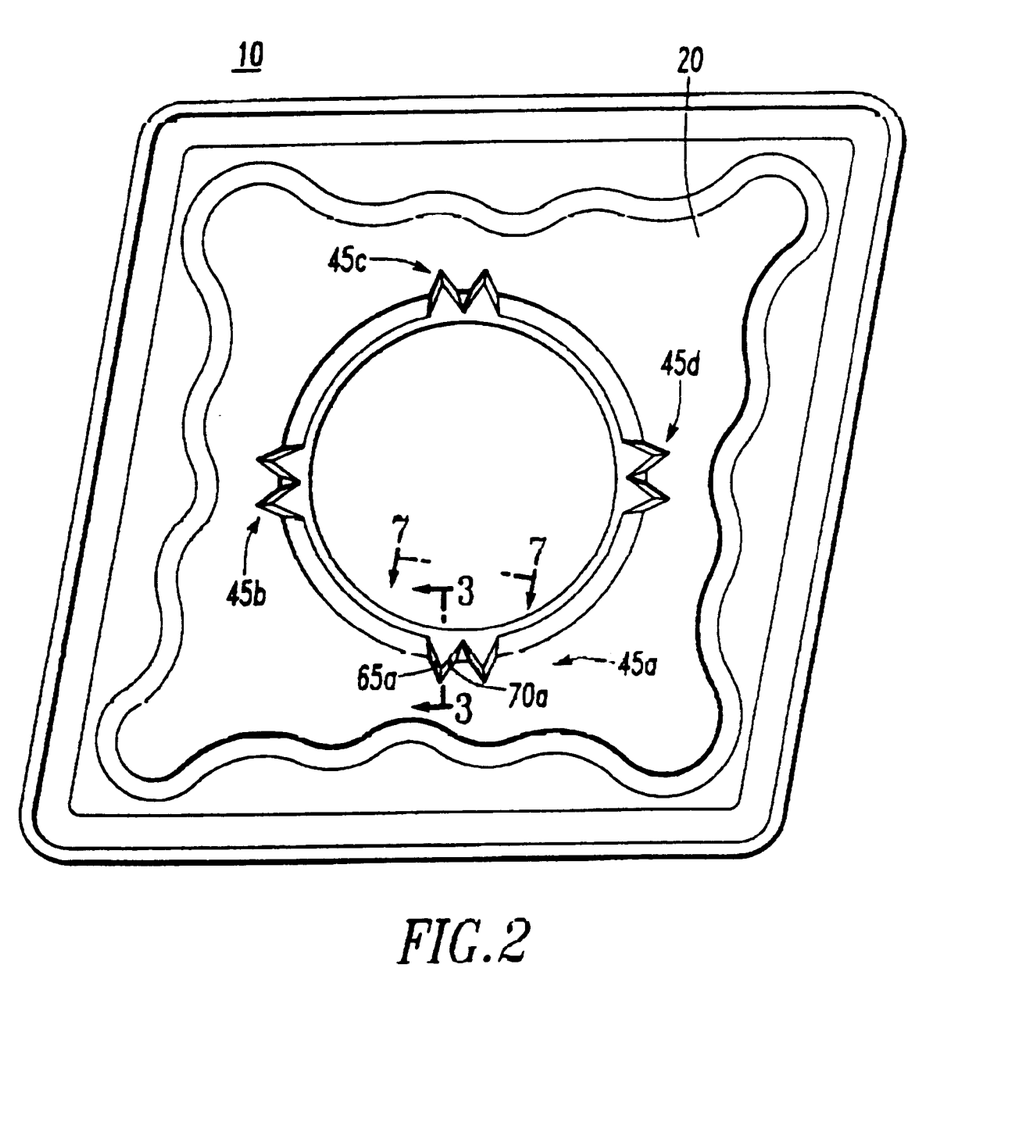
FIG. 2 is a top view of the insert in FIG. 1.
Figure 3:
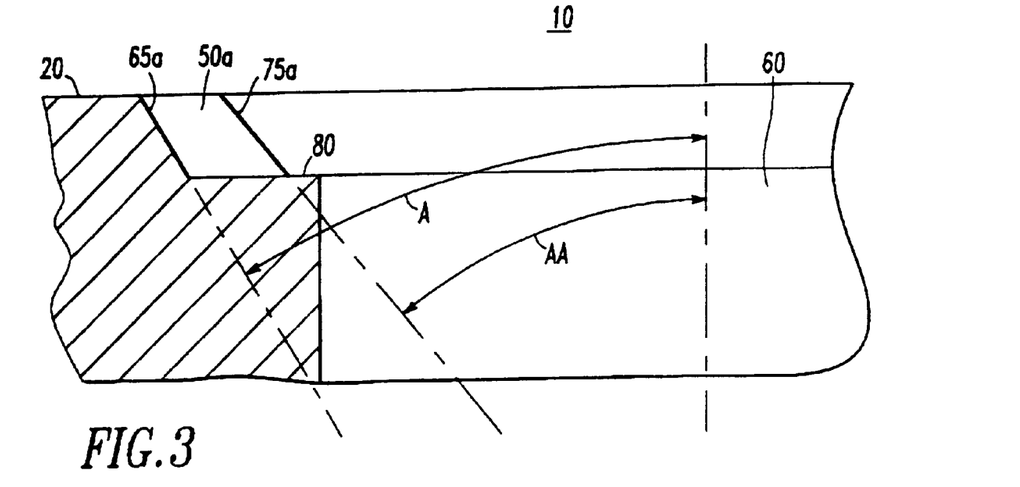
FIG. 3 is a cross-sectional view of the insert in FIG. 2 along arrows "3—3"

FIG. 3 illustrates a cross section of a protrusion 50a illustrated by arrows "3—3" in FIG. 2. The protrusion 50a is recessed in the top surface 20. One method of fabricating the protrusions of the subject cutting insert utilizes a pressing operation known to those skilled in the art of cutting insert fabrication. To simplify this pressing operation for imparting the protrusion 50a into the top surface 20, walls 65a, 70a (FIG. 7) of the protrusion 50a are angled relative to the top surface 20. Additionally, to simplify the pressing operation, adjacent to the center aperture 60 is a beveled face 75a extending along a planar ring surface 80 adjacent to the center aperture 60. It should be noted that each of the features intended to simplify the pressing operation is intended only for that reason and should not be considered a limitation in the subject invention.

The angle wall 65a, as illustrated in FIG. 3, may have an angle A relative to a line extending perpendicular to the center aperture 60 between 5° and 85°. While not illustrated in FIG. 3, it should be appreciated that angled wall 70a (FIG. 7) may also form such an angle A relative to such a perpendicular line. The face 75a may form an angle AA relative to a line extending perpendicular to the center aperture 60 between 5° and 85°.

In the embodiment illustrated in FIGS. 1–3, the protrusion 50a V-shaped but the top of the V is opened towards the center aperture 60.

The marks 45a, b, c and d are positioned approximately perpendicular to their associated cutting edges 35a, b, c, d to indicate the type of usage recommended for that cutting edge. When the cutting insert 10 has a center aperture 60 and multiple marks are utilized, each mark 45a, b, c, d is symmetrically positioned about the center of the insert and may be at a position along a line P extending perpendicular to the respective cutting edge 35a, b, c, d and intersecting with the longitudinal axis L.

As will be explained, certain cutting inserts do not have a center aperture and, although the insert in FIGS. 1–3 has such a central aperture, the subject invention should not be limited to such an embodiment.

The cutting insert 10 may be comprised of any number of hard materials utilized for metalworking operations including machine steel, cemented carbide, ceramic or a cemented carbide substrate having any number of different coatings to improve the insert characteristics.

While FIGS. 1–3 have illustrated a cutting insert 10 in which a mark 45a is comprised of two protrusions 50a, 55a, as illustrated in previously discussed Table 1, the quantity of protrusions may be utilized to indicate the recommended cutting range of the insert, and in accordance with the DIN Standard, four different quantities may be utilized, each representing a different cutting range. As previously mentioned, the geometric shape of a protrusion may be a non alpha-numeric character including a shape such as a circle, square or other geometric shape. However, to maximize understanding, the universally accepted shape of a triangle is utilized as the preferred embodiment of the subject invention.

The insert illustrated in FIGS. 1–3 has a mark with two protrusions which, in accordance with Table 1, is for an insert used in general purpose applications.

Figure 4:
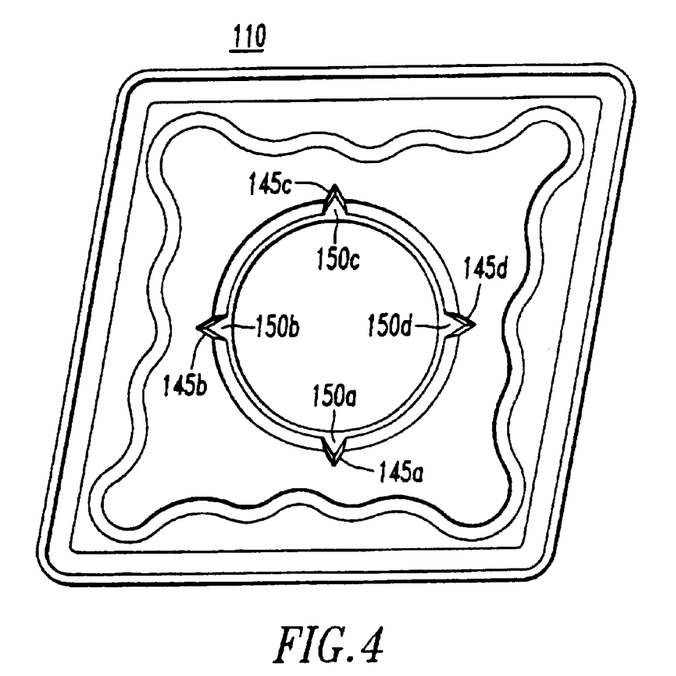
FIG. 4 is a top view of a cutting insert in accordance with another variation of the first embodiment of the subject invention.

Consistent with that, FIG. 4 illustrates a top view of an insert 110 similar to that in FIGS. 1–3 but utilizing a set of four marks 145a, b, c, d with each mark having a single protrusion 150a, b, c, d located in the same region as in the protrusions 50a, b, c, d in FIGS. 1–3. A mark with a single protrusion, in accordance with Table 1, is for an insert used in roughing applications.

Figure 5:
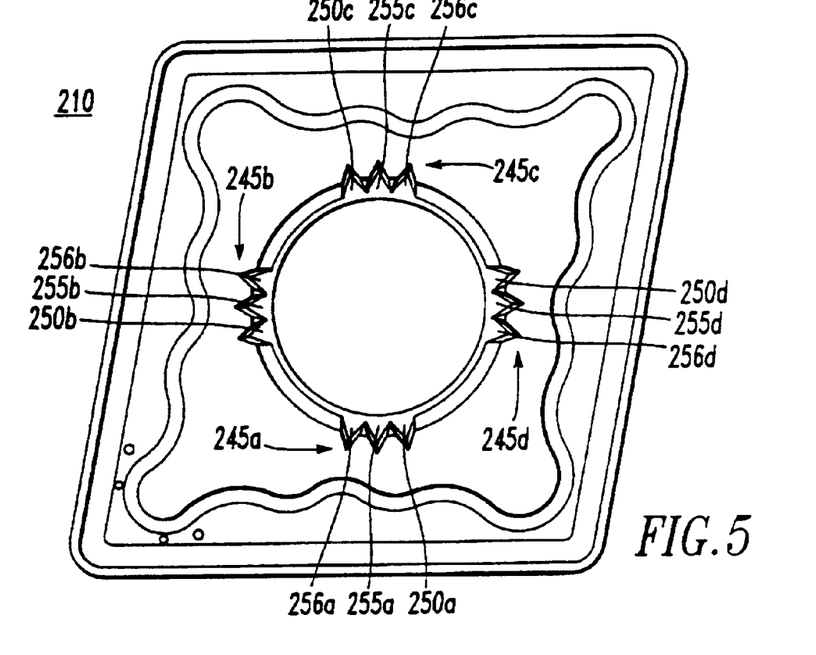
FIG. 5 is a top view of another variation of the first embodiment in accordance with the subject invention.

FIG. 5 illustrates a cutting insert 210 similar to that illustrated in FIGS. 1–3, however, including four marks 245a, b, c, d with each mark having three separate protrusions illustrated by the suffixes a, b, c, and d for each reference number 250, 255 and 256 arranged in the same region as those in FIGS. 1–3. A mark with three protrusions, in accordance with Table 1, is for an insert used in finishing applications.

Figure 6:
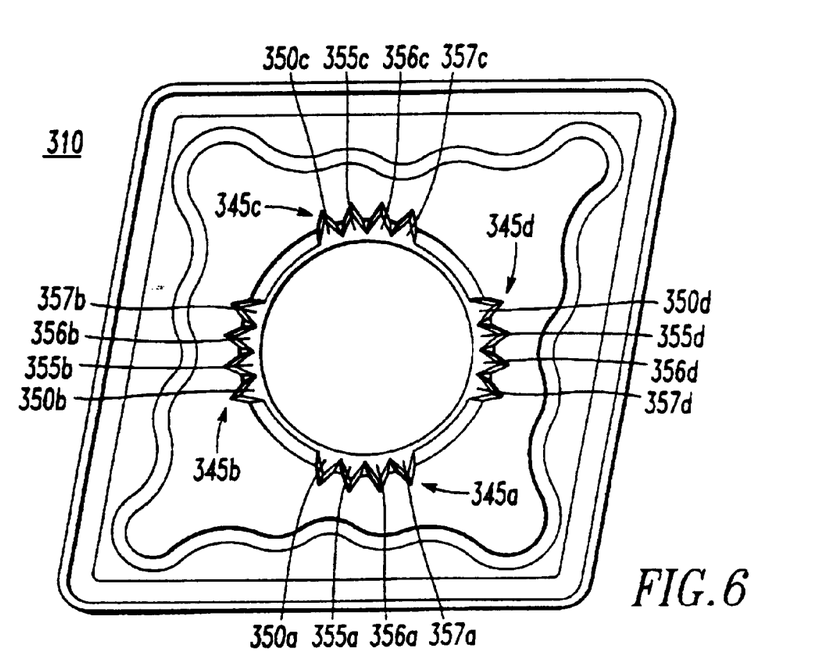
FIG. 6 is a top view of yet another variation of the first embodiment of the subject invention.

FIG. 6 illustrates a cutting insert 310 similar to that illustrated in FIGS. 1–3, however, including four separate marks 345 a, b, c, and d with each mark having four protrusions illustrated by the suffixes a, b, c, d for each reference number 350, 355, 356 and 357 arranged in the same region as those in FIGS. 1–3. A mark with four protrusions, in accordance with Table 1, is for an insert used in fine finishing operations.

Figure 7:
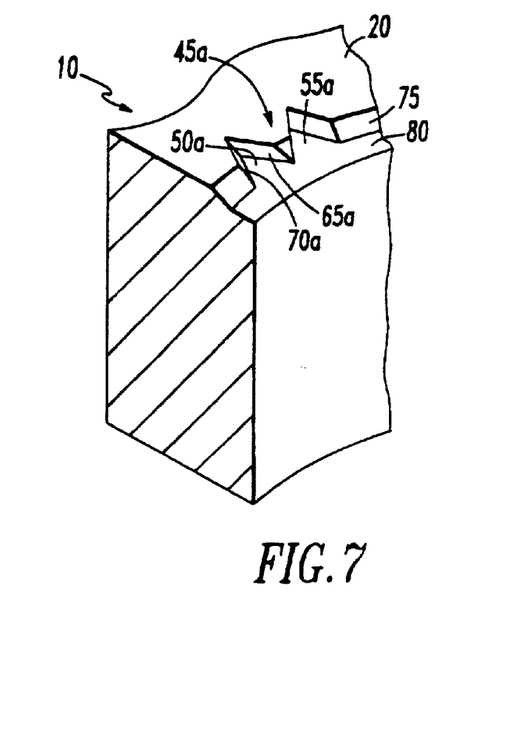
FIG. 7 is a perspective view of the section indicated in FIG. 2 by arrows "7—7"

FIG. 7 is a view indicated by arrows "7—7" in FIG. 2 and illustrates a portion of the cutting insert 10 in which the mark 45a includes two protrusions 50a, 55a extending into the top surface 20 as previously described. It should be noted that this presentation of a V shape to approximate a triangle is only illustrative as one of many shapes which may be presented on a surface of the cutting insert 10.

Figure 8:
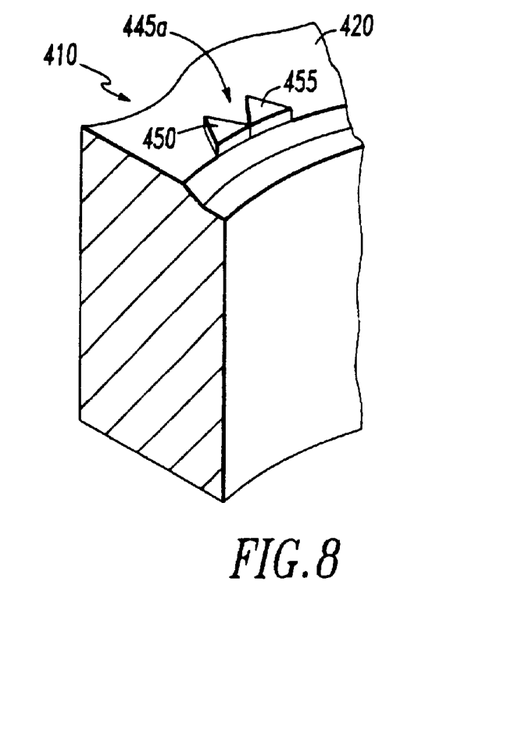
FIG. 8 is a second embodiment of the subject invention whereby the protrusions extend from the top surface of an insert having a center hole.

FIG. 8 illustrates a view similar to that shown in FIG. 7 with the exception that the mark 445 is now comprised of two protrusions for 450, 455 which extend from the top surface 420 and which are not recessed within the top surface 420.

As previously discussed, it is entirely possible for the cutting insert to be manufactured without a central aperture. Such an insert may still utilize marks with protrusions in accordance with the subject invention as illustrated in FIGS. 9 and 10.

Figure 9:
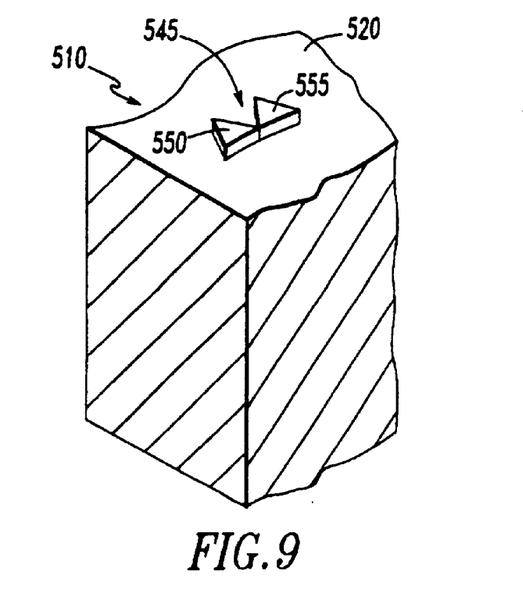
FIG. 9 is a third embodiment of the invention whereby the protrusions are extended from the top surface of the cutting insert and whereby the insert does not have a center hole.

FIG. 9 illustrates a view similar to that shown in FIG. 7 of a cutting insert 510 having features similar to that of insert 10 with the exception that the insert does not have a central aperture but does have a top surface 520 which extends across the face of the insert 510. In this instance, the mark 545 may be comprised of protrusions 550, 555 extending from the top surface 520 in the non-active region of the cutting insert. Furthermore, where a mark 545 is associated with each cutting edge, such marks may be symmetrically spaced adjacent the respective cutting edge. When there is only a single mark, such a mark may be placed anywhere in the non-active region of the insert.

Figure 10:
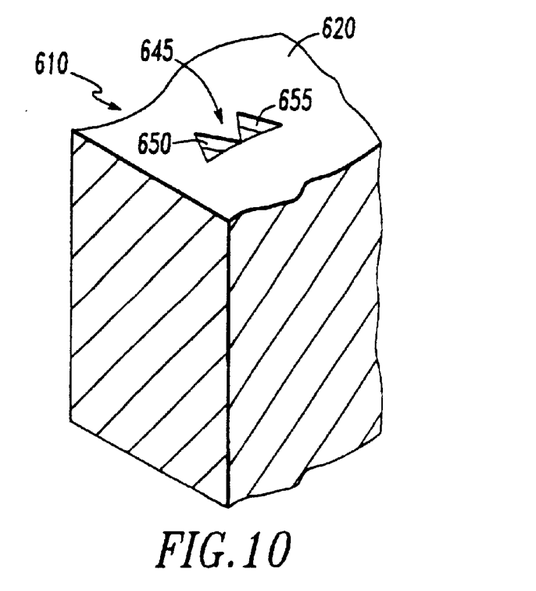
FIG. 10 is fourth embodiment of the subject invention whereby the protrusions are recessed within the top surface of the cutting insert and the cutting insert does not have a center hole.
Figure 11:
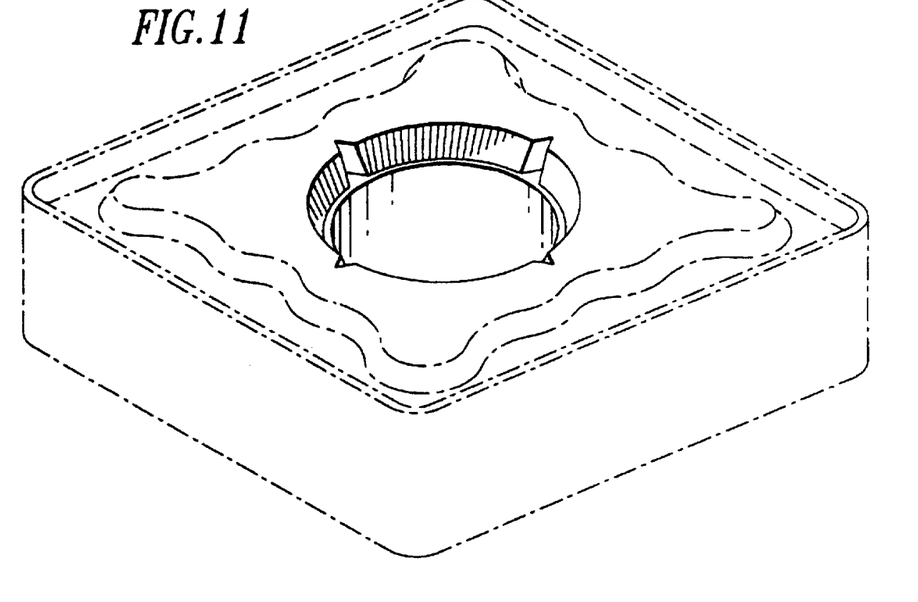
FIG. 11 is a perspective view of a quadrilateral insert illustrating a series of marks whereby each mark is comprised of one protrusion.
Figure 12:
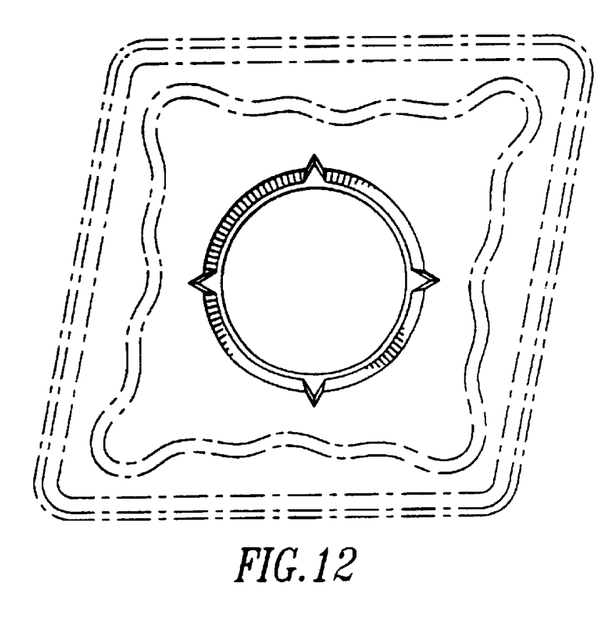
FIG. 12 is a top view of the insert illustrated in FIG. 11, the bottom view is identical.
Figure 13:
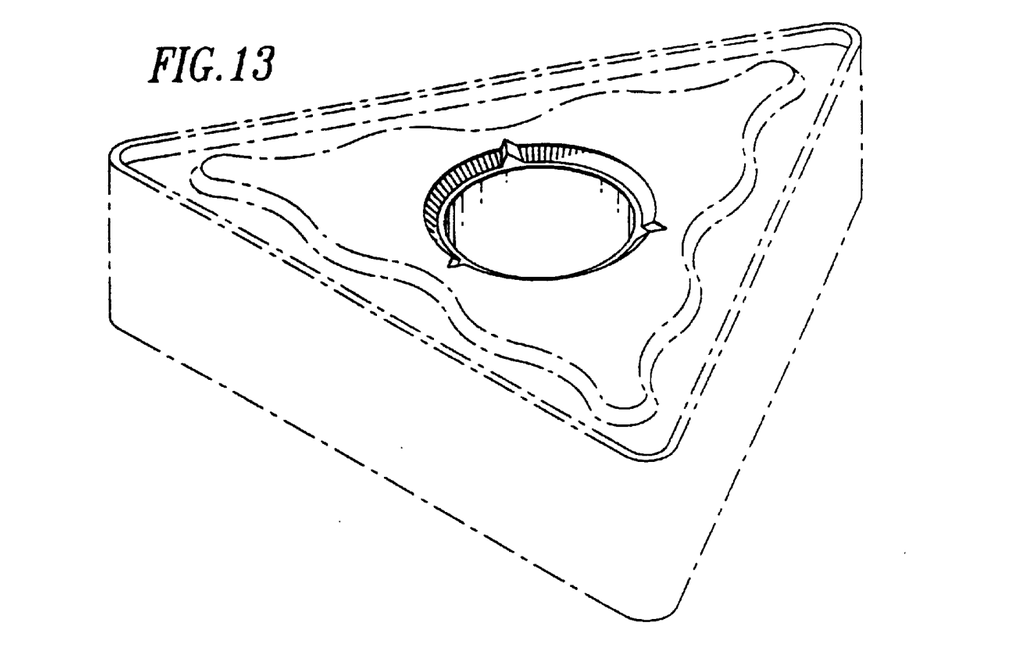
FIG. 13 is a perspective view of a triangular insert illustrating a series of marks whereby each mark is comprised of one protrusion.
Figure 14:
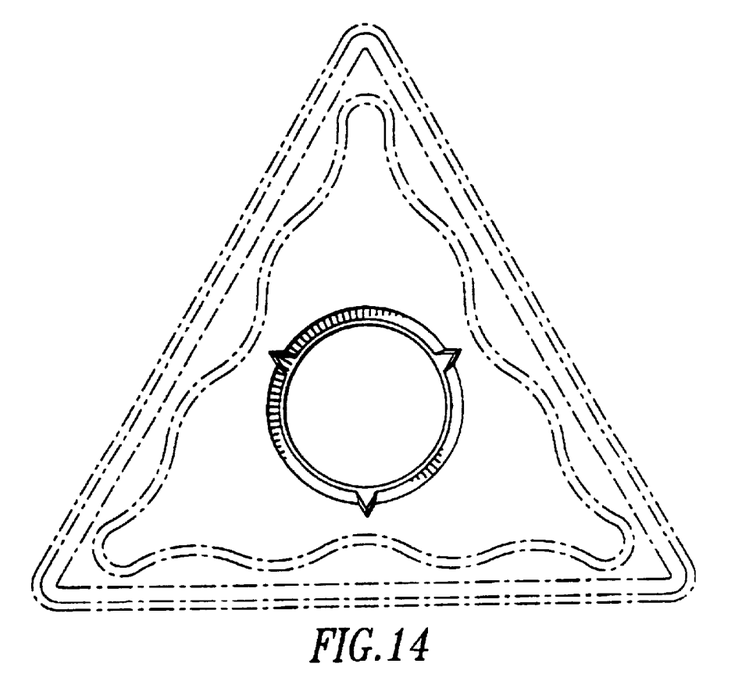
FIG. 14 is a top view of the insert illustrated in FIG. 13, the bottom view is identical.
Figure 15:
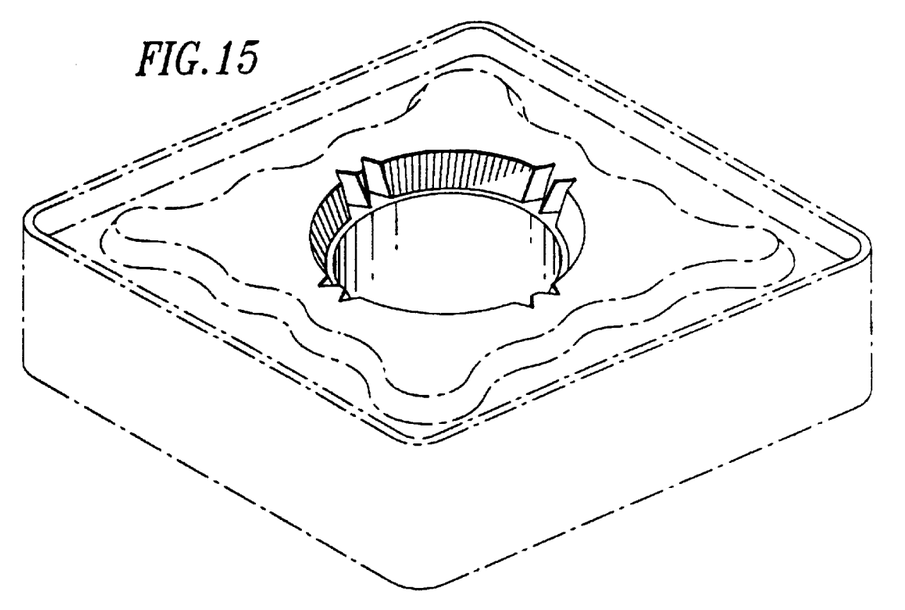
FIG. 15 is perspective view of a quadrilateral insert illustrating a series of marks, each comprised of two protrusions.
Figure 16:
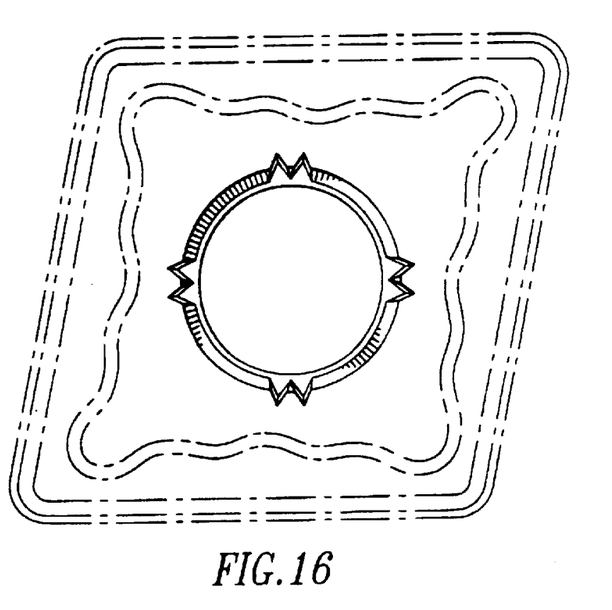
FIG. 16 is a top view of the insert illustrated in FIG. 15, the bottom view is identical.
Figure 17:
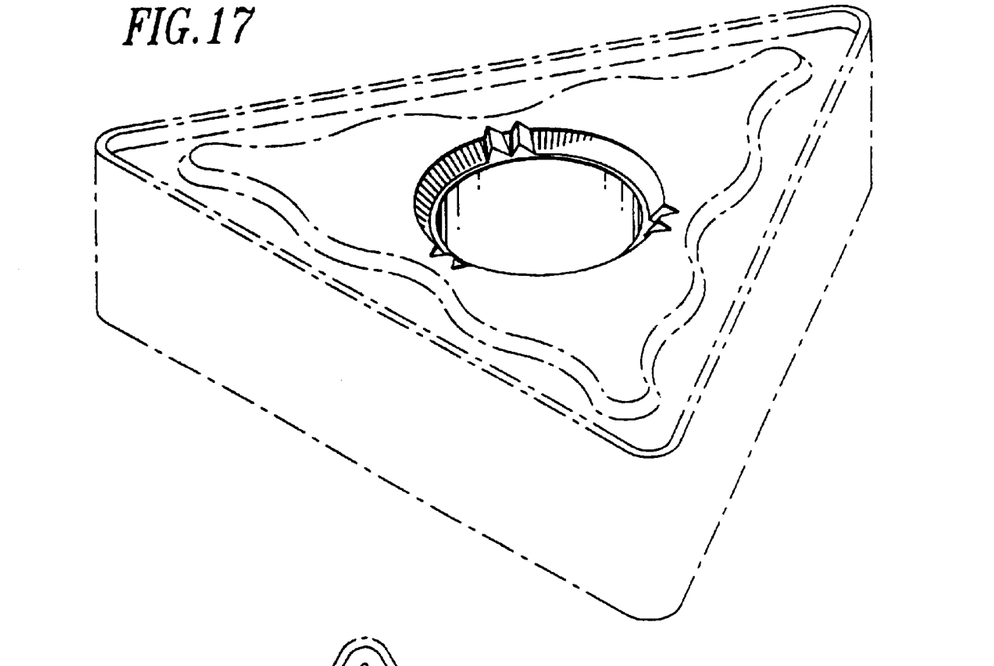
FIG. 17 is a perspective view of a triangular insert with a series of marks whereby each mark is comprised of two protrusions.
Figure 18:
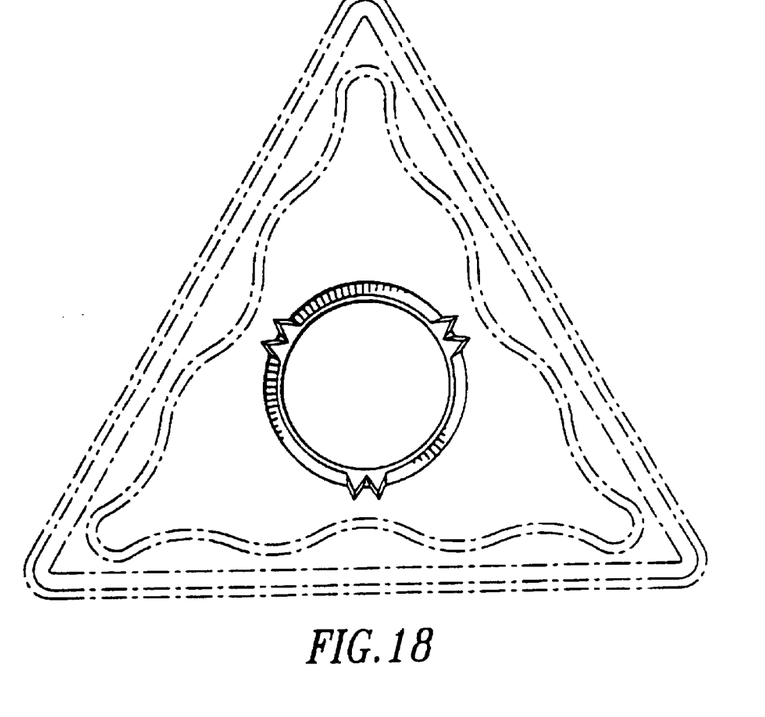
FIG. 18 is a top view of the insert illustrated in FIG. 17, the bottom view is identical.
Figure 19:
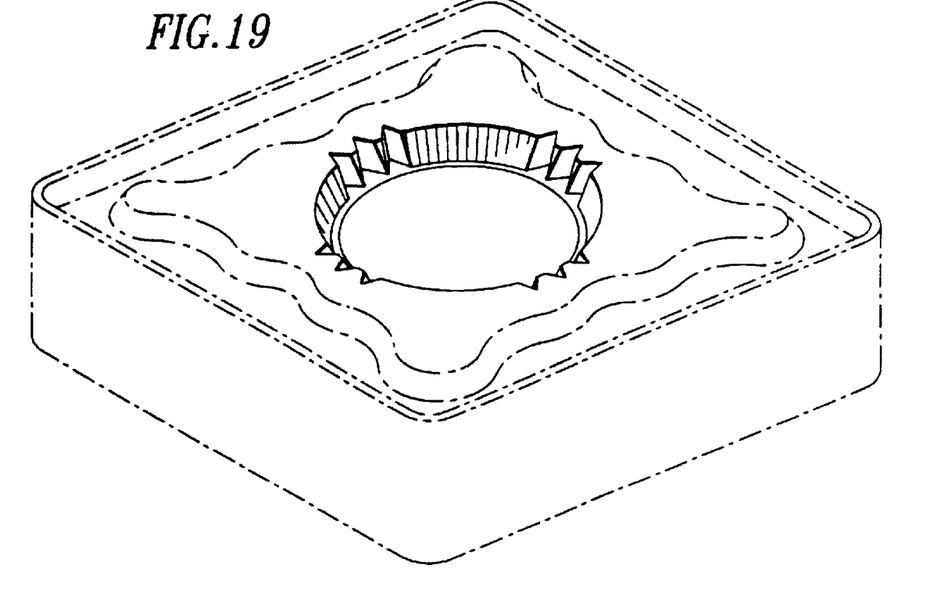
FIG. 19 is perspective view of a quadrilateral insert illustrating a series of marks, whereby each mark is comprised of three protrusions.
Figure 20:
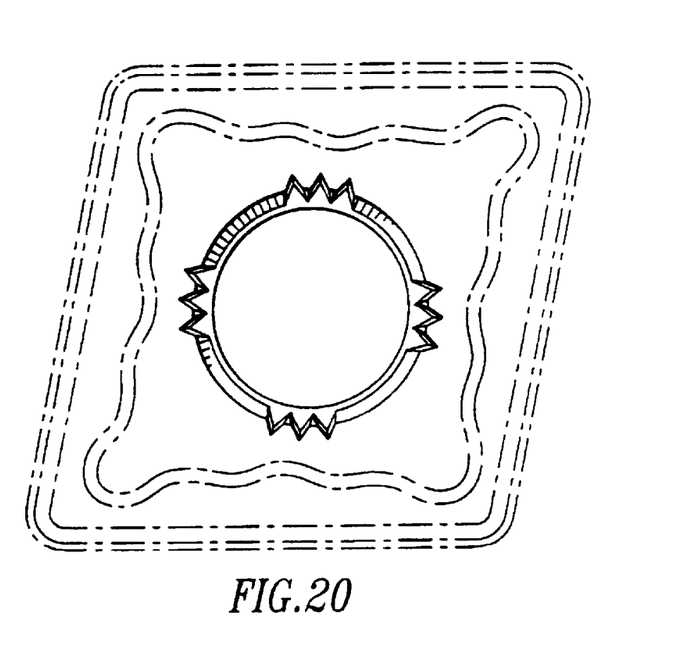
FIG. 20 is a top view of the insert illustrated in FIG. 19, the bottom view is identical.
Figure 21:
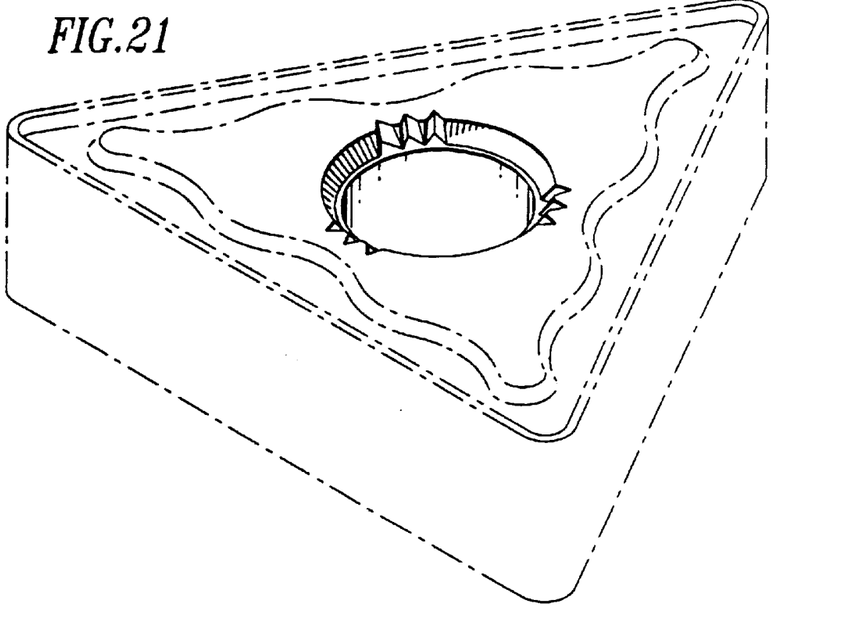
FIG. 21 is a perspective view of a triangular insert with a series of marks whereby each mark is comprised of three protrusions.
Figure 22:
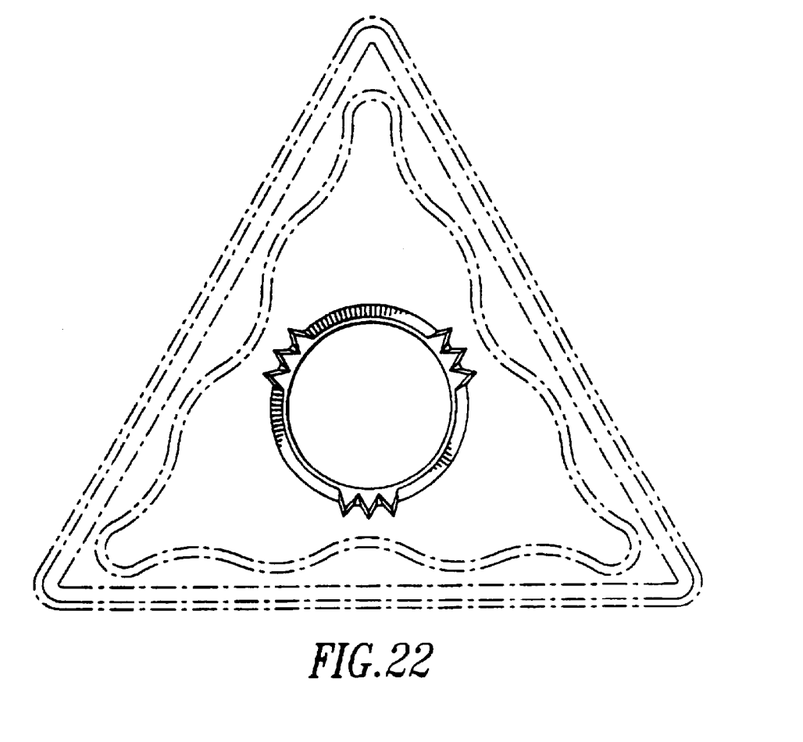
FIG. 22 is a top view of the insert illustrated in FIG. 21, the bottom view is identical.
Figure 23:
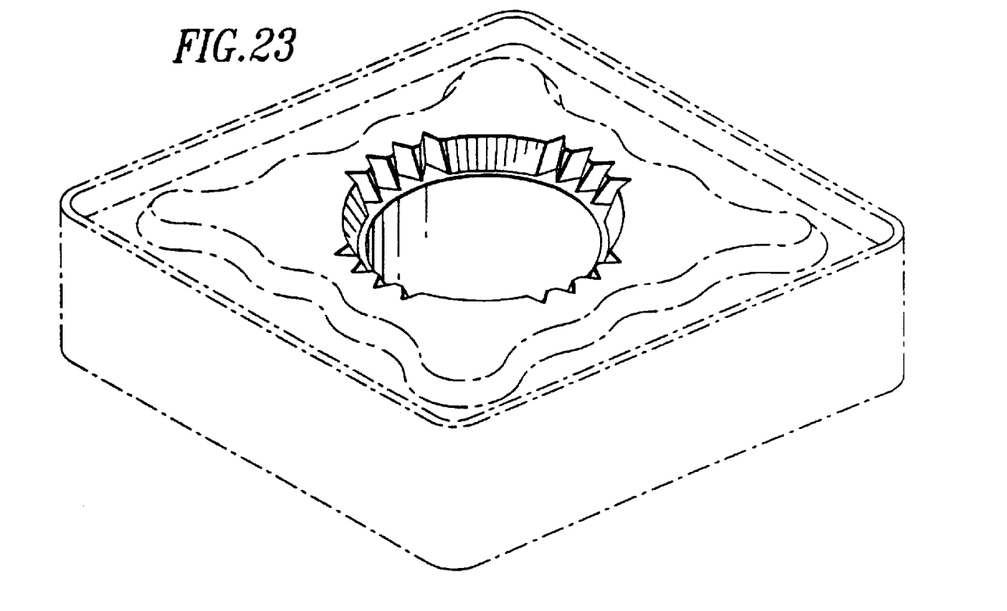
FIG. 23 is perspective view of a quadrilateral insert illustrating a series of marks, whereby each mark is comprised of four protrusions.
Figure 24:
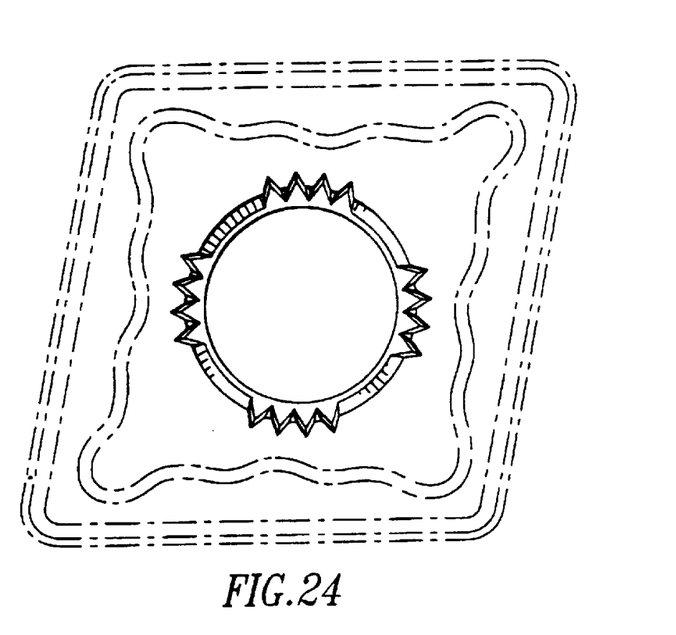
FIG. 24 is a top view of the insert illustrated in FIG. 23, the bottom view is identical.
Figure 25:
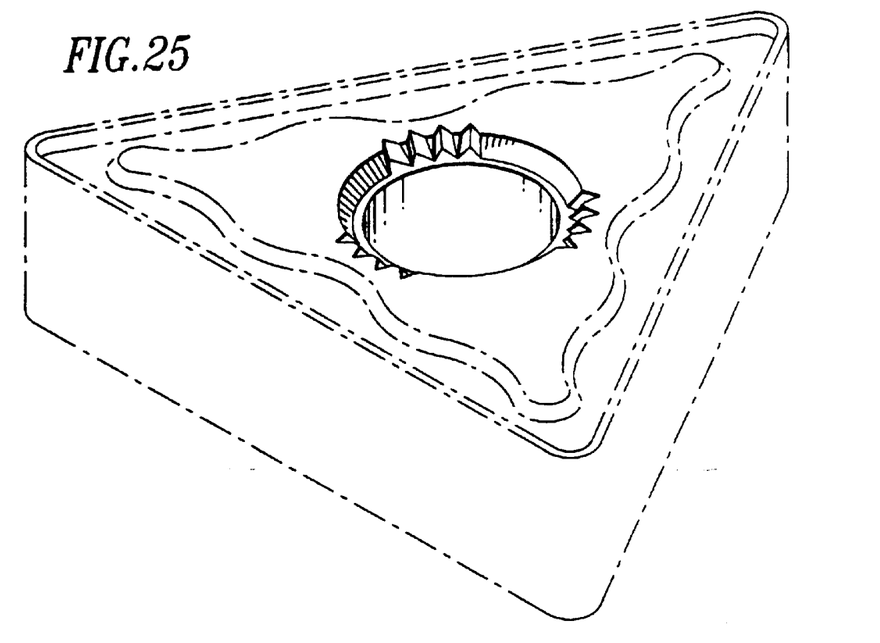
FIG. 25 is a perspective view of a triangular insert with a series of marks whereby each mark is comprised of four protrusions.
Figure 26:
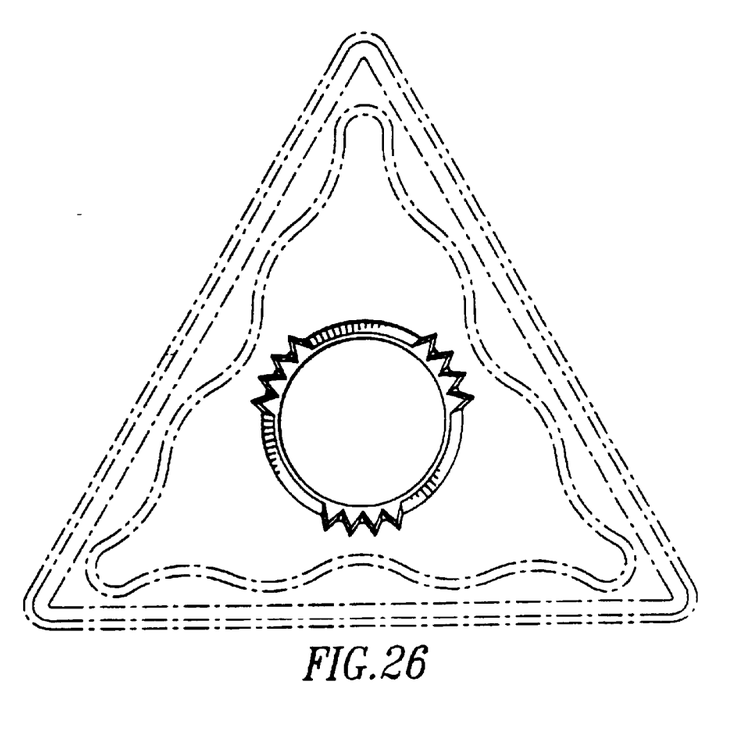
FIG. 26 is a top view of the insert illustrated in FIG. 25, the bottom view is identical.

FIG. 10 illustrates a view similar to that shown in FIG. 7 of another insert 610 in which the top surface 620 extends across the insert such as that insert in FIG. 1. However, unlike the illustration in FIG. 9, the mark 645 in FIG. 10 is comprised of two protrusions 650, 655 which are recessed within the top surface 620 to form two distinct triangular shapes.

While FIGS. 7–10 illustrate a mark with two protrusions, it should be appreciated that any mark may have multiple protrusions and the range of quantities of protrusions in a mark may be, but are not limited to, between one to four.

So far, the cutting insert as an article has been discussed. A method for marking such an insert, similar to that in FIGS. 1–3, comprises a step of imparting a mark 45a to the top surface 20 of the insert 10 in the non-active region IR wherein the mark 45a is comprised of at least two identical imprinted protrusions 50a, 55a adjacent to each other on the top surface 20 and wherein the quantity of the protrusions indicates the recommended insert usage. The same features as previously discussed may be imparted to the shape of the protrusions, and in the instance where the insert has a central aperture 60, each mark 45a is imprinted on the top surface 20 at a location symmetric about the center 60 of the insert 10. In the instance where the top surface 20 of the insert 10 extends across the insert 10, then each mark 45a may be imprinted at each location symmetric with the other marks and perpendicular to a line extending from the respective cutting edge or when there is only a single mark may be imprinted at a location anywhere in the non-active region.

It should be appreciated that while a mark having two protrusions has been used for the majority of this discussion, such a discussion should apply equally to the other embodiments utilizing marks with one or more protrusions. Additionally, it should be realized that a quadrilateral insert, illustrated in each of these figures, was presented only for convenience and the marks discussed herein are equally applicable to an insert having any number of sides. Under such circumstances, the mark may be positioned symmetrically along a line perpendicular to a respective cutting edge when there are multiple marks or in the alternative, when a single mark is utilized it may be placed anywhere in the non-active region of that cutting insert.

FIGS. 11–25 illustrate perspective and top views of quadrilateral and triangular inserts with marks having protrusions ranging in quantity from one to four in accordance with the subject invention.

Finally, although these markings have been discussed in relation to cutting inserts, it should be appreciated that this marking may also be utilized on other cutting tools other than cutting inserts such as drill bits or in the alternative, upon tools which depend on abrasion to remove material.

It is thought that the present invention and many of its intended advantages will be understood from the foregoing description and it will be apparent that various changes may be made in the form, construction and arrangement of the parts thereof without departing from the spirit or scope of the invention or sacrificing all of its material advantages, the form herein before described being merely preferred or exemplary embodiments thereof.

What is claimed:

1. A cutting insert comprised of:
    a) a polygonal shaped body having a top surface and a bottom surface with sides therebetween and a cutting edge at the intersection of each side with the top surface, thereby defining an active cutting region on the top surface spaced along and extending inwardly from the cutting edge to about one third of a distance to the center of the insert and an inactive region over the remaining area of the top surface;
    b) a mark positioned on the top surface of the insert in the inactive region, wherein the mark consisting of identical imprinted protrusions adjacent to each other on the top surface and wherein the quantity of protrusions in a mark indicates the recommended insert usage.

2. The insert according to claim 1 wherein the quantity of protrusions in a mark corresponds to the DIN standard for surface finish.

3. The insert according to claim 1 wherein each protrusion is "V" shaped.

4. The insert according to claim 1 wherein each protrusion is triangular in shape.

5. The insert according to claim 1 wherein each protrusion extends into the top surface.

6. The insert according to claim 1 wherein each protrusion extends from the top surface.

7. The insert according to claim 1 further including additional identical marks wherein each mark is opposite a cutting edge indicating the type of usage recommended for the respective cutting edges.

8. The insert according to claim 1 wherein the insert has a center and each mark is symmetrically positioned about the center of the insert.

9. The insert according to claim 8 wherein the insert has a hole extending through the center and the marks are symmetrically positioned about the hole.

10. A cutting insert comprised of:
    a) a polygonal shaped body having a top surface and a bottom surface with sides therebetween and a cutting edge at the intersection of each side with the top surface, thereby defining an active cutting region on the top surface spaced along and extending inwardly from the cutting edge to about one third of a distance to the center of the insert and an inactive region over the remaining area of the top surface;
    b) a plurality of marks positioned on the top surface of the insert in the inactive region, wherein each mark is identical and consist of imprinted protrusions having a "V" shape and recessed within the top surface of the insert, wherein each mark is adjacent to a respective cutting edge.

11. A method for marking a cutting insert having a polygonal shaped body with a top surface and a bottom surface with sides therebetween and a cutting edge at the intersection of each side with the top surface defining a cutting region spaced along and extending inwardly from the cutting edge to about one third of a distance to the center of the insert and an inactive region over the remaining area of the top surface, wherein the method comprises the step of:
    a) imparting a mark to the top surface of the insert in the inactive region, wherein the mark consists of identical imprinted protrusions adjacent to each other on the top surface and wherein the quantity of protrusions indicates the recommended insert usage.

12. The method according to claim 11 wherein the step of imparting a mark comprises imparting a quantity of protrusions in a mark which corresponds to the DIN standard 3141 for surface finish.

13. The method according to claim 11 wherein the step of imparting a mark comprises imparting a "V" shape to each protrusion in the mark.

14. The method according to claim 11 wherein the step of imparting a mark comprises imparting a triangular shape to each protrusion in the mark.

15. The method according to claim 11 wherein the step of imparting a mark comprises imparting each protrusion to extend into the top surface.

16. The method according to claim 11 wherein the step of imparting a mark comprises imparting each protrusion to extend from the top surface.

17. The method according to claim 11 wherein multiple identical marks are imparted to the top surface proximate to each cutting edge indicating the type of usage recommended for the respective cutting edge.

18. The method according to claim 11 wherein the insert has a center and each mark is imparted on the top surface at a location symmetric about the center of the insert.

19. The method according to claim 18 wherein the insert has a hole extending through the center and each mark is imparted on the top surface at a location symmetric about the hole.

20. A cutting insert for machining of a workpiece comprising:
    a) a polygonal shaped body having a top surface and a bottom surface with sides therebetween and a cutting edge at the intersection of each side with the top surface, thereby defining an active cutting region on the top surface spaced along and extending inwardly from the cutting edge to about one third of a distance to the center of the insert and an inactive region over the remaining area of the top surface;
    b) a mark positioned on the top surface of the insert in the inactive region consisting of identical non alphanumeric characters wherein the quantity of non alphanumeric characters indicates the recommended insert usage.

21. A method of marking a cutting insert to identify a particular usage and a particular surface finish achieved on a workpiece to be machined, the cutting insert having a polygonal shaped body with a top surface and a bottom surface with sides therebetween and a cutting edge at the intersection of each side with the top surface defining a cutting region spaced along and extending inwardly from the cutting edge to about one third of a distance to the center of the insert and an inactive region over the remaining area of the top surface, wherein the method comprises the steps of:
    a) identifying an insert and recommended insert usage; and
    b) imparting to the top surface of the insert in the inactive region a mark consisting of identical non alphanumeric characters indicative of the recommended insert usage.

* * * * *